March 15, 1955  G. MARCO  2,704,132
OVERLOAD SAFETY DEVICE FOR INDUSTRIAL TRUCK
Filed Jan. 11, 1950  2 Sheets-Sheet 1
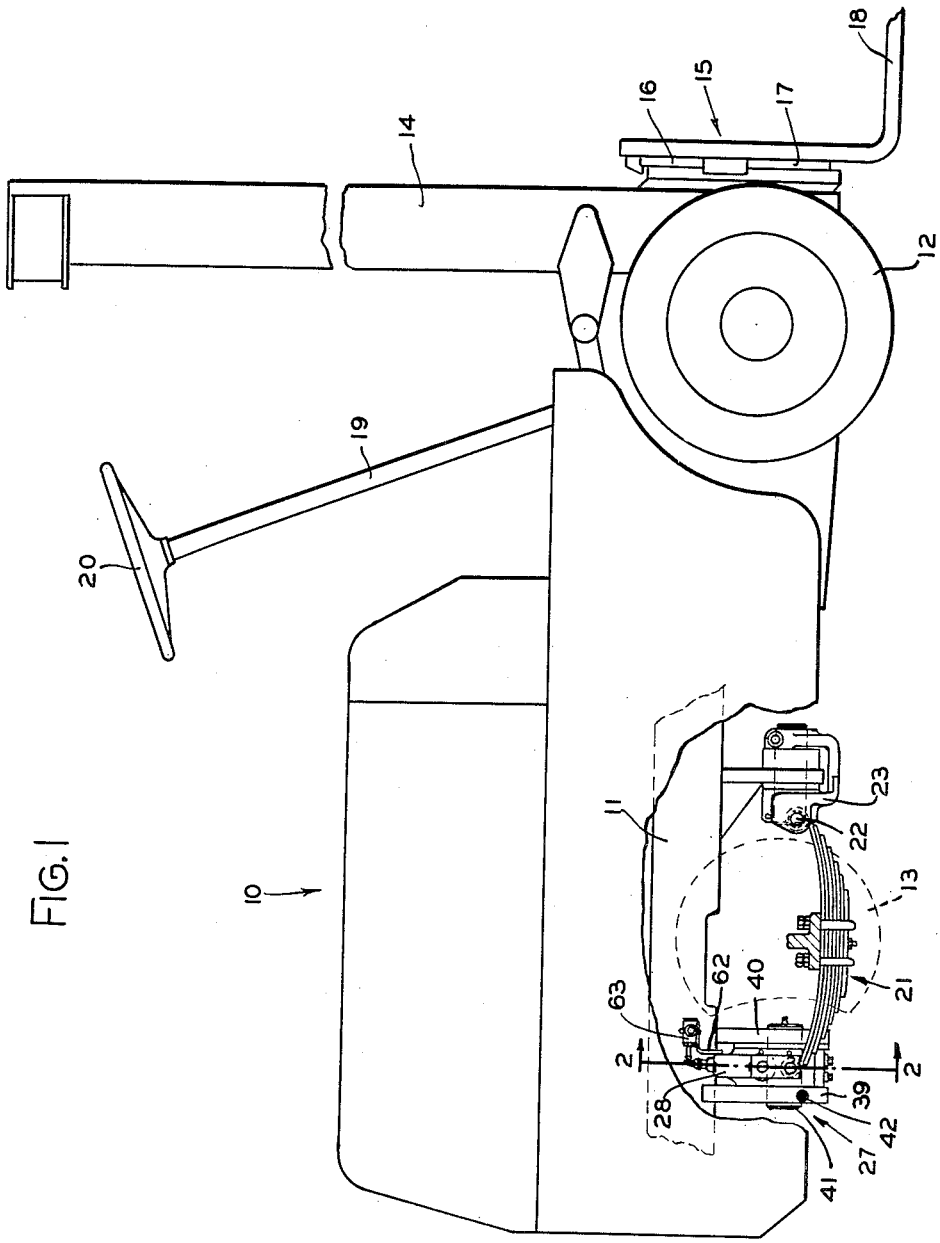
INVENTOR.
GEORGE MARCO
BY Brown, Jackson,
Boettcher & Dienner
ATTY.

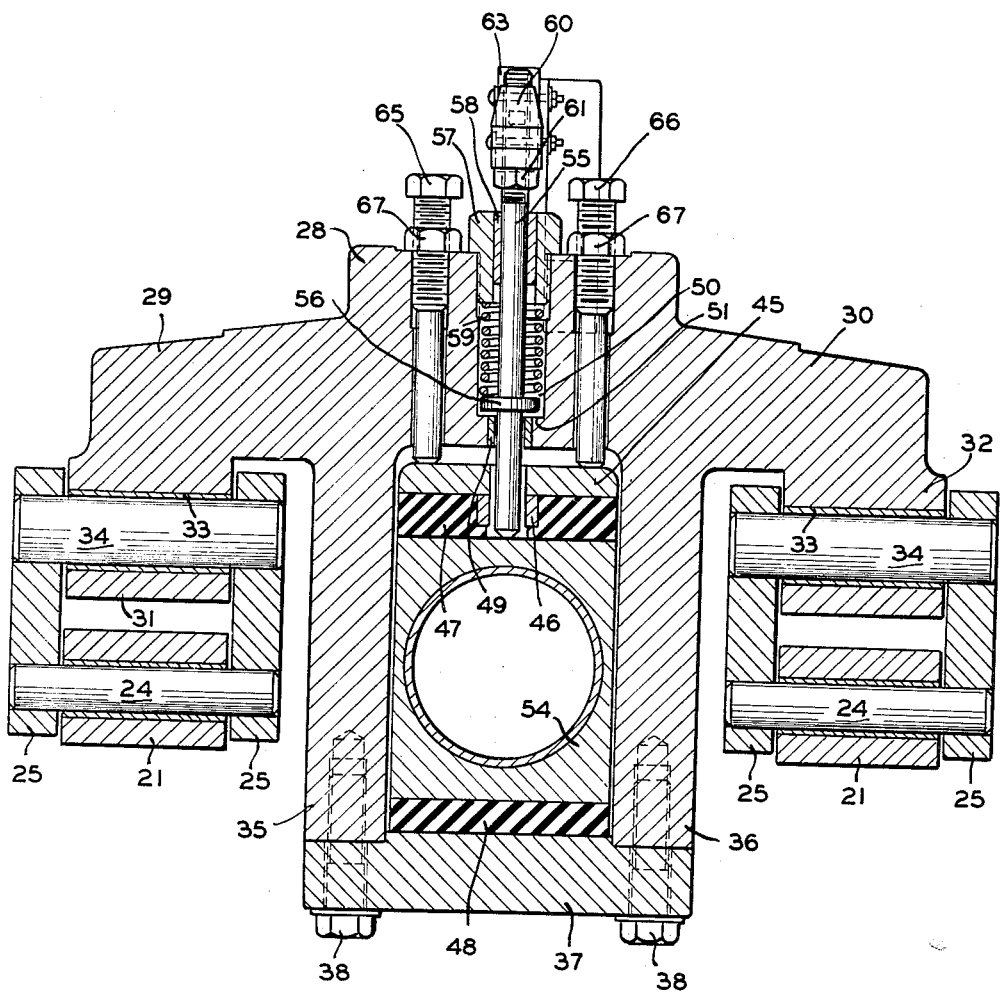

United States Patent Office 2,704,132
Patented Mar. 15, 1955

2,704,132

OVERLOAD SAFETY DEVICE FOR INDUSTRIAL TRUCK

George Marco, Battle Creek, Mich., assignor to Clark Equipment Company, Buchanan, Mich., a corporation of Michigan Application January 11, 1950, Serial No. 138,007

4 Claims. (Cl. 180—82)

My invention relates generally to industrial trucks and is more particularly directed to overload safety means for an industrial truck.

Industrial trucks of the character to which I make reference are frequently utilized for transporting loads weighing more than the maximum rated load carrying capacity of the truck. Overloading is generally due to the inability of the truck operator to ascertain either the rated capacity of the truck or the total weight of the loads that are to be engaged by the latter. Such overloading causes the forward end of the truck to tilt forwardly, thus permitting a load to slip from the load carrying means which, in some cases, results in injuries to workmen or damage to equipment nearby. Overloading further causes severe stresses to be set up in the various components of the truck which may result in serious damage to the latter. Thus, it will be realized that overloading of an industrial truck is undesirable, both from the standpoint of safety and service life of the truck.

It is an object of my present invention to provide an industrial truck with overload safety means, which will automatically interrupt the electrical circuit of the prime mover of the truck for preventing the latter from being moved when a load is engaged that weighs more than the maximum rated load carrying capacity of the truck.

I propose to accomplish the aforementioned object by providing, between the rear ends of the rear leaf spring units and the adjacent portions of the main frame of the truck, support means of a character which will permit limited relative vertical movement between the main frame and the rear ends of the leaf spring units. When a load is engaged by the load supporting means, adjacent the forward end of the truck, the main frame pivots about the forward axle of the truck causing the rear end to tilt upwardly, urging it away from the rear ends of the leaf spring units. This upward tilting of the rear end of the main frame is proportional to the weight of the load carried at the forward end of the truck. I utilize this relative movement to effect opening of a switch, connected in series in the electrical circuit of the prime mover of the truck, when the distance between the main frame and the rear end of the leaf spring units exceeds a predetermined value corresponding to the maximum rated load carrying capacity of the truck.

It is another object of my present invention to provide means for my overload safety device for varying the ratio of the magnitude of the relative movement between the main frame and the rear end of the spring units, and the weight of the load engaged at the forward end of the truck, so that the overload safety device may be incorporated with various trucks of different load carrying capacities.

It is a further object of my present invention to provide an overload safety device of efficient and simple design which can be constructed at low cost.

Now, in order to acquaint those skilled in the art with the manner of constructing and using devices in accordance with the principles of my present invention, I shall describe in connection with the accompanying drawings a preferred embodiment of my invention.

In the drawings:

Figure 1 is a side elevational view of an industrial truck, with portions being broken away, showing the overload safety device of my present invention; and Figure 2 is a sectional view of the overload safety device of my present invention, taken along the line 2—2 in Figure 1, looking in the direction indicated by the arrows.

Referring now to Figure 1, there is shown an industrial truck, indicated generally by the reference numeral 10, having a main frame comprising a pair of horizontally spaced apart lengthwise extending main side frame members, one of which is indicated at 11. The main side frame members 11 are supported at their forward ends by means of an axle (not shown) and a pair of driving wheels mounted at the ends thereof, one of which is indicated at 12, and are supported at their rear ends by means of an axle (not shown) and a pair of steering wheels mounted at the ends thereof, one of which is indicated diagrammatically at 13. A detail description of the mounting means between the main side frame members 11 and the rear axle will be included hereinafter. Pivotally mounted adjacent the forward end of the main side frame members 11 is a substantially vertically extending mast 14, of conventional construction, in which a vertically movable carriage, indicated generally at 15, is carried. The carriage 15 comprises a pair of transversely extending frame members 16 and 17, which are adapted to suitably support one or more load supporting fork frames 18.

The industrial truck 10 is provided with a steering column 19 having a hand wheel 20 at its upper end, which is adapted to be manipulated by an operator of the truck for maneuvering the latter. The truck is further provided with a prime mover (not shown) as, for example, an internal combustion engine, including conventional ignition means. Suitable drive means (not shown) comprising clutch and transmission means, is also provided between the prime mover and the drive wheels 12.

The transversely extending rear axle has secured at each end thereof a pair of parallel spaced apart conventional leaf spring units 21 for absorbing road shocks transmitted to the wheels 13. The leaf spring units 21 are pivotally mounted adjacent their forward ends, by means of pins 22, to supporting bracket members, one of which is shown at 23 and one depending from each of the side frame members 11. Disposed through the eyelets formed in the rear ends of the leaf springs 21, as shown in Figure 2, are shackle pins 24, the ends of which are fixed within suitable openings formed in the lower ends of shackles 25.

Adjacent one side of the truck there is interposed, between the opposite ends of the shackles 25 and the main side frame member 11, the overload safety device of my present invention, indicated generally at 27. The safety device 27 comprises a bracket 28 having integral arm portions 29 and 30, extending outwardly at opposite sides thereof transversely of the main frame 11. At the ends of the arm portions 29 and 30 are formed integral downwardly projecting portions 31 and 32. Aligned horizontal openings are formed in the downwardly projecting portions 31 and 32, and bushings 33 are disposed therein which are adapted to provide a bearing support for the shackle pins 34, which pins are fixed at their ends in suitable openings formed in the upper ends of each pair of shackles 25.

The intermediate portion of the bracket 28 is provided with a pair of parallel spaced apart downwardly projecting walls 35 and 36 to which a plate member 37 is secured at the bottom edges thereof as by bolts 38, thus defining a horizontal channel or opening in which a substantially cube-shaped bearing block 54 is disposed.

A pair of downwardly extending parallel spaced apart support members 39 and 40 are secured to the main side frame member 11, adjacent the opposite sides of the bracket 28. A shaft 41 is disposed through a central opening formed in the bearing block 54 and the ends of the shaft 41 are adapted to extend through openings in the support members 39 and 40 adjacent the lower ends thereof. The shaft 41 is held against axial movement by means of a key 42, which engages a groove in the periphery of the shaft 41.

Disposed adjacent the upper surface of the bearing block 54 is a substantially square horizontal metallic cushion plate member 45 having a central opening formed therein. Secured to the lower surface of the plate member 45, about the central opening therein, is an annular guide sleeve member 46. Interposed between the plate member 45 and the bearing block 54 is a generally square resilient member 47 having a central opening therein conformed to receive the guide sleeve 46. A second substantially square resilient member 48 is interposed between the lower surface of the bearing block 54 and the plate member 37.

In order to preload the resilient members 47 and 48, and to vary the preloading thereof, a pair of adjusting bolts 65 and 66 are threaded at their upper ends into partially threaded vertical openings formed in the bracket 28, one at each side of the follower 55. A nut 67 is provided for each adjusting bolt 65 and 66 intermediate the ends of the threaded portions for adjustably locking the bolts 65 and 66 in a predetermined vertical position. The lower ends of the bolts 65 and 66 are adapted to engage the upper surface of the plate member 45.

A central vertical opening 50 is formed in the bracket 28 and, at the lower end of the opening, the cross-sectional area is reduced and a bushing member 49 mounted therein, thus providing a horizontal annular shoulder 51. A follower rod 55, disposed in the vertical opening 50, extends through the bushing 49 and is guided in vertical movement at its lower end by the latter. The lower end of the follower 55 extends through the opening in the plate member 45 and annular guide sleeve 46 and is adapted to engage the upper surface of the bearing block 54. An annular stop member 56 is formed intermediate of the ends of the follower 55 and is adapted to engage the shoulder 51, thus limiting downward movement of the follower 55. The upper end of the opening 50 is threaded for receiving a guide member 57 having a bushing sleeve 58 for additionally guiding the follower 55, at its upper end, in vertical movement. A spring 59 is disposed in the opening 50 between the lower end of the guide member 57 and the annular stop member 56, for urging the stop member 56 and follower 55 downward.

The upper end of the follower 55 is threaded to receive a cam nut 60 which may be adjustably secured in a predetermined position by means of a lock nut 61. As shown in Figure 1, a bracket 62 is secured to one side of the bracket 28 adjacent the upper portion thereof and is provided for supporting a switch 63, commonly known as a "micro-switch," in a horizontal position. The end of the plunger of the switch 63 is adapted to engage the conical surface of the cam nut 60 and thus it may be observed that vertical movement of the follower 55 and cam nut 60 is translated into horizontal movement of the plunger of the switch 63 for opening and closing the latter. The switch 63 is electrically connected in series with the ignition means of the internal combustion engine of the industrial truck.

The following is a description of the operation of the overload safety device of my present invention:

When there is no load on the fork supporting frames 18 of the truck 10, the rear end of the latter exerts a downward force on the ends of the spring units 21. This downward force is transmitted from the main frame through the bracket members 23 to the pins 22, carried at the forward ends of the spring units 21. The downward force is also transmitted from the main frame 11 to the pair of support members 39 and 40, the shaft 41, and the bearing block 54. The bearing block 54 is thus urged downward against the resilient block member 48 and the plate member 37, forcing the bracket 28 downward, which is supported through shackles 25 on the rear ends of the spring units 21. The rear frame of the truck is thus supported adjacent each side thereof at two points, namely, the forward and rear ends of the spring units 21.

A load may be engaged by the fork supporting frames 18, by maneuvering the truck 10 so as to dispose the forks 18 beneath a pallet supported load and then raising the carriage 15, together with the pallet and load, from the ground. When a load is thus engaged, the main frame of the truck pivots in a vertical plane about the front axle, causing the rear end of the main frame to swing upwardly, because of the weight of the load on the forks. The amount of upward movement of the rear end of the main frame is proportional to the weight of the load carried by the forks 18. This upward movement of the rear end of the main frame causes the support members 39 and 40, the shaft 41, and the bearing block 54 to be urged upwardly. When the magnitude of the force urging the bearing block 54 upward, against the resilient member 47, increases to a point where the resilient member 47 is compressed, the follower 55 is forced upward. Upward movement of the follower 55 and cam nut 60 pushes the plunger of the switch 63 inwardly, causing the latter to be opened. Opening of the switch 63 effects opening of the circuit to the ignition system of the internal combustion engine.

The overload safety device may be adjusted to open the switch 63 when any predetermined magnitude of weight is engaged by the forks 18. This adjustment is accomplished by varying the vertical position of the adjusting bolts 65 and 66, which preload the resilient member 47 to the desired degree. In other words, the greater the resilient member 47 is preloaded, or compressed, the larger the weight that may be supported on the forks 18 without the switch 63 being opened, since a greater force is required to urge the plunger 55 upwardly. Conversely, the lesser the resilient member 47 is preloaded, the smaller the weight that may be supported by the forks 18 without the switch 63 being opened, since a smaller force is sufficient to urge the plunger 55 upwardly.

It will thus be observed that if the weight picked up by the forks 18 of the truck 10 is more than the predetermined value, established as a standard for the particular truck, the switch 63 is opened and the prime mover of the truck is stopped, thus preventing the truck from being moved as long as the excessive load remains on the forks 18.

It will further be realized that while I have shown and described the safety device as being incorporated on only one side of the truck, a like unit may be disposed on the opposite side of the truck if the loads involved and the arrangement of the elements of the truck necessitate the same.

It should further be noted that while I have described the switch 63 as being electrically connected in series with the ignition means of an internal combustion engine, the switch may be readily inserted into the electrical circuit of an electric motor if the truck is powered by a prime mover of this class.

While I have shown and described what I consider to be a preferred embodiment of my invention, it will be understood that various modifications and rearrangements may be made therein without departing from the spirit and scope of my invention.

I claim:

1. In an industrial truck having a prime mover and an electrical circuit for operating the latter, the combination of a main frame, leaf spring means for supporting the latter, said leaf spring means extending parallel of said frame and being mounted at their forward ends to said frame, overload safety means comprising, supporting means interposed between the main frame and the rear end of at least one of said leaf spring means for permitting limited relative movement therebetween, each of said supporting means comprising a pair of parallel spaced apart support members secured to said main frame and projecting downwardly therefrom, a shaft extending between said support members, a bracket fixed to said leaf spring means and disposed between said support members, said bracket having an opening therethrough, through which said shaft is adapted to extend for limited vertical movement therein, a switch electrically connected in the electrical circuit of the prime mover, and means carried by said bracket having operable connection to said switch for opening the latter when the distance between the main frame and the rear end of the leaf spring means exceeds a predetermined value corresponding to the maximum rated load carrying capacity of the truck.

2. In an industrial truck having a prime mover and an electrical circuit for operating the latter, the combination of a main frame, leaf spring means associated with the rear axle of the truck, said leaf spring means extending parallel of said frame and being mounted at their forward ends to said frame, overload safety means comprising, supporting means interposed between the main frame and the rear end of at least one of the leaf spring means for permitting limited relative movement therebetween, each of said supporting means comprising a pair of parallel spaced apart support members secured to said main frame and projecting downwardly therefrom, a shaft extending between said support members, a journal block carried intermediate of the ends of said shaft, a bracket fixed to said leaf spring means and disposed between said support members, said bracket having an opening therethrough in which said journal block is disposed for limited vertical movement therein, resilient members between the upper and lower surfaces of said journal block and the adjacent portions of said bracket, means for preloading said resilient members, a switch electrically connected in the electrical circuit of the prime mover, and means carried by said bracket having operable connection to said switch for opening the latter when the distance between the main frame and the rear end of the leaf spring means exceeds a predetermined value corresponding to the maximum rated load carrying capacity of the truck.

3. In an industrial truck having a main frame, a prime mover supported on the main frame, an electrical circuit for operating the latter, a mast at the forward end of the main frame, load engaging means carried by the mast, an axle and wheel assembly disposed at the rear end of the main frame, and leaf spring means associated with the axle and extending parallel of the frame, the combination of overload safety means comprising, supporting means interposed between the main frame and the rear end of at least one of the leaf spring means for permitting limited relative movement therebetween, each of said supporting means comprising a pair of parallel spaced apart support members secured to said main frame and projecting downwardly therefrom, a shaft extending between said support members, a journal block carried intermediate of the ends of said shaft, a bracket fixed to said leaf spring means and disposed between said support members, said bracket having an opening therethrough in which said journal block is disposed for limited vertical movement therein, resilient members between the upper and lower surfaces of said journal block and the adjacent portions of said bracket, means for preloading said resilient members, a switch electrically connected in the electrical circuit of the prime mover, and means carried by said bracket having operable connection to said switch for opening the latter when the distance between the main frame and the rear end of the leaf spring means exceeds a predetermined value corresponding to the maximum rated load carrying capacity of the truck.

4. In an industrial truck having a prime mover and an electrical circuit for operating the latter, the combination of a main frame, leaf spring means for supporting the latter, said leaf spring means extending parallel of said frame and being mounted at their one ends to said frame, overload safety means comprising, supporting means interposed between the main frame and the other end of at least one of said leaf spring means for permitting limited relative movement therebetween, each of said supporting means comprising a pair of parallel spaced apart support members secured to said main frame and projecting downwardly therefrom, a shaft extending between said support members, a bracket fixed to said leaf spring means and disposed between said support members, said bracket having an opening therethrough, through which said shaft is adapted to extend for limited vertical movement therein, a switch electrically connected in the electrical circuit of the prime mover, and means carried by said bracket having operable connection to said switch for actuating the latter whereby the electrical circuit is deenergized when the distance between the main frame and the said other end of the leaf spring means changes a predetermined amount from a preselected value.

References Cited in the file of this patent

UNITED STATES PATENTS

| | | |
|---|---|---|
| 1,122,797 | Osterhoudt | Dec. 29, 1914 |
| 1,206,953 | Wales | Dec. 5, 1916 |
| 1,436,191 | Nichols | Nov. 21, 1922 |
| 2,350,909 | Lapsley | June 6, 1944 |
| 2,475,963 | Howell | July 12, 1949 |